(12) United States Patent
Lindgren et al.

(10) Patent No.: US 12,619,922 B2
(45) Date of Patent: May 5, 2026

(54) TRAINING EMBEDDING MODELS USING A STALE EMBEDDING CACHE FOR NEGATIVE SAMPLING

(71) Applicant: Google LLC, Mountain View, CA (US)

(72) Inventors: Erik Michael Lindgren, New York, NY (US); Sashank Jakkam Reddi, Jersey City, NJ (US); Ruiqi Guo, Elmhurst, NY (US); Sanjiv Kumar, Jericho, NY (US)

(73) Assignee: GOOGLE LLC, Mountain View, CA (US)

( * ) Notice: Subject to any disclaimer, the term of this patent is extended or adjusted under 35 U.S.C. 154(b) by 803 days.

(21) Appl. No.: 17/983,130

(22) Filed: Nov. 8, 2022

(65) Prior Publication Data

US 2023/0153700 A1 May 18, 2023

Related U.S. Application Data

(60) Provisional application No. 63/277,385, filed on Nov. 9, 2021.

(51) Int. Cl.
| | |
|---|---|
| *G06N 20/20* | (2019.01) |
| *G06F 12/0875* | (2016.01) |
| *G06F 12/0891* | (2016.01) |
| *G06F 16/245* | (2019.01) |

(52) U.S. Cl.
CPC ......... *G06N 20/20* (2019.01); *G06F 12/0875* (2013.01); *G06F 12/0891* (2013.01); *G06F 16/245* (2019.01)

(58) Field of Classification Search
None
See application file for complete search history.

(56) References Cited

PUBLICATIONS

Wang et al., Cross-Batch Negative Sampling for Training Two-Tower Recommenders, arXiv:2110.15154v1 [cs.IR] Oct. 28, 2021; Total pp. 5 (Year: 2021).*
Lin et al., In-Batch Negatives for Knowledge Distillation with Tightly-Coupled Teachers for Dense Retrieval; Proceedings of the 6th Workshop on Representation Learning for NLP (RepL4NLP-2021); Aug. 6, 2021. © 2021 Association for Computational Linguistics; pp. 163-173 (Year: 2021).*

(Continued)

*Primary Examiner* — Alan Chen
(74) *Attorney, Agent, or Firm* — DORITY & MANNING P.A.

(57) ABSTRACT

Provided are systems and methods which more efficiency train embedding models through the use of a cache of item embeddings for candidate items over a number of training iterations. The cached item embeddings can be "stale" embeddings that were generated by a previous version of the model at a previous training iteration. Specifically, at each iteration, the (potentially stale) item embeddings included in the cache can be used when generating similarity scores that are the basis for sampling a number of items to use as negatives in the current training iteration. For example, a Gumbel-Max sampling approach can be used to sample negative items that will enable an approximation of a true gradient. New embeddings can be generated for the sampled negative items and can be used to train the model at the current iteration.

20 Claims, 4 Drawing Sheets

(56) References Cited

PUBLICATIONS

Hwang et al., Centaur: A Chiplet-based, Hybrid Sparse-Dense Accelerator for Personalized Recommendations; arXiv:2005. 05968v1 [cs.DC] May 12, 2020; Total pp. 14 (Year: 2020).*

Agarwal., "The Infinite Push: A New Support Vector Ranking Algorithm that Directly Optimizes Accuracy at the Absolute Top of the List", SIAM International Conference on Data Mining, Mesa, Arizona, United States, Apr. 20-30, 2011, 12 pages.

Bai et al., "Tapas: Two-Pass Approximate Adaptive Sampling for Softmax", arXiv:1707.03073v2, Jul. 14, 2017, 10 pages.

Bajaj et al., "Ms. Marco: A Human Generated Machine Reading Comprehension Dataset", arXiv:1611.09268v3, Oct. 31, 2016, 11 pages.

Bengio et al., "Adaptive Importance Sampling to Accelerate Training of a Neural Probabilistic Language Model", Transactions on Neural Networks, vol. 19, No. 4, Feb. 2, 2008, 31 pages.

Boyd et al., "Accuracy at the Top", Neural Information Processing Systems, Lake Tahoe, Nevada, United States, Dec. 3-8, 2012, 9 Pages.

Bromley et al., "Signature Verification Using a "Siamese" Time Delay Neural Network", International Conference on Neural Information Processing Systems, Denver, Colorado, United States, Nov. 29-Dec. 2, 1993, pp. 737-744.

Chen et al., "SPTAG: A Library for Fast Approximate Nearest Neighbor Search", 2018, https://github.com/Microsoft/SPTAG, retrieved on Dec. 7, 2022, 5 pages.

Craswell et al., "Overview of the TREC 2019 Deep Learning Track", arXiv:2003.07820v2, Mar. 18, 2020, 22 pages.

Devlin et al., "Bert: Pre-Training of Deep Bidirectional Transformers for Language Understanding", arXiv:1810.04805v2, May 24, 2019, 16 pages.

Gillick et al., "Learning Dense Representations for Entity Retrieval", arXiv:1909.10506v1, Sep. 23, 2019, 10 pages.

Guo et al., "Accelerating Large-Scale Inference with Anisotropic Vector Quantization", arXiv:1908.10396v5, Dec. 4, 2020, 18 pages.

Gutmann et al., "Noise-Contrastive Estimation of Unnormalized Statistical Models, with Applications to Natural Image Statistics", Journal of Machine Learning Research, vol. 13, 2012, pp. 307-361.

Guu et al., "REALM: Retrieval-Augmented Language Model Pre-Training", arXiv:2002.08909v1, Feb. 10, 2020, 12 pages.

He et al., "Momentum Contrast for Unsupervised Visual Representation Learning", arXiv:1911.05722v3, Mar. 23, 2020, 12 pages.

Henderson et al., "Efficient Natural Language Response Suggestion for Smart Reply", arXiv:1705.00652v1, May 1, 2017, 15 pages.

Humeau et al., "Poly-Encoders: Transformer Architectures and Pre-Training Strategies for Fast and Accurate Multi-sentence Scoring", arXiv:1905.01969v4, Mar. 25, 2020, 14 pages.

Jean et al., "On Using Very Large Target Vocabulary for Neural Machine Translation", arXiv:1412.2007v2, Mar. 18, 2015, 10 pages.

Jia et al., "Scaling Up Visual and Vision-Language Representation Learning with Noisy Text Supervision", arXiv:2102.05918v2, Jun. 11, 2021, 14 pages.

Joachims, "A Support Vector Method for Multivariate Performance Measures", International Conference on Machine Learning, Bonn, Germany, Aug. 7-11, 2005, pp. 377-384.

Johnson et al., "Billion-Scale Similarity Search with GPUs", arXiv:1702. 08734v1, Feb. 28, 2017, 12 pages.

Kar et al., "Surrogate Functions for Maximizing Precision at the Top", arXiv:1505.06813v1, May 26, 2015, 31 pages.

Karpukhin et al., "Dense Passage Retrieval for Open-Domain Question Answering", arXiv:2004.04906v3, Sep. 30, 2020, 13 pages.

Kingma et al., "Adam: A Method for Stochastic Optimization", arXiv:1412.6980v9, Jan. 30, 2017, 15 pages.

Kwiatkowski et al., "Natural Questions: A Benchmark for Question Answering Research", Transactions of the Association of Computational Linguistics, vol. 7, 2019, pp. 453-466.

Mikolov et al., "Distributed Representations of Words and Phrases and Their Compositionality", arXiv:1310.4546v1, Oct. 16, 2013, 9 pages.

Mnih et al., "A Fast and Simple Algorithm for Training Neural Probabilistic Language Models", arXiv:1206.6426, Jun. 27, 2012, 8 pages.

Morin et al., "Hierarchical Probabilistic Neural Network Language Model", Tenth International Workshop on Artificial Intelligence and Statistics, Bridgetown, Barbados, Jan. 6-8, 2005, 6 pages.

Mussmann et al., "Fast Amortized Inference and Learning in Log-Linear Models with Randomly Perturbed Nearest Neighbor Search", arXiv:1707.03372v1, Jul. 11, 2017, 15 pages.

Qu et al., "Rocketqa: An Optimized Training Approach to Dense Passage Retrieval for Open-Domain Question Answering", arXiv:2010. 08191v2, May 12, 2021, 13 pages.

Rawat et al., "Sampled Softmax with Random Fourier Features", arXiv:1907.10747v2, Dec. 31, 2019, 23 pages.

Reddi et al., "Stochastic Negative Mining for Learning with Large Output Spaces", arXiv:1810.07076v1, Oct. 16, 2018, 18 pages.

Robertson et al., "The Probabilistic Relevance Framework: BM25 and Beyond", Foundations and Trends in Information Retrieval, vol. 3, No. 4, pp. 333-389.

Schroff et al., "FaceNet: A Unified Embedding for Face Recognition and Clustering", arXiv:1503.03832v3, Jun. 17, 2015, 10 pages.

Shrivastava et al., "Training Region-Based Object Detectors with Online Hard Example Mining", arXiv:1604.03540v1, Apr. 12, 2016, 9 pages.

Vaswani et al., "Attention is All You Need", arXiv:1706.03762v5, Dec. 6, 2017, 15 pages.

Vijayanarasimhan et all., "Deep Networks with Large Output Spaces", arXiv:1412.7479v4, Apr. 10, 2015, 9 pages.

Wu et al., "Sampling Matters in Deep Embedding Learning", arXiv:1706.07567v2, Jan. 16, 2018, 10 pages.

Xiong et al., "Approximate Nearest Neighbor Negative Contrastive Learning for Dense Text Retrieval", arXiv:2007.00808v2, Oct. 20, 2020, 16 pages.

Yi et al., "Sampling-Bias-Corrected Neural Modeling for Large Corpus Item Recommendations", Association of Computing Machinery Conference on Recommender Systems, Copenhagen, Denmark, Sep. 16-20, 2019, 9 pages.

Zhan et al., "Learning to Retrieve: How to Train a Dense Retrieval Model Effectively and Efficiently", arXiv:2010.10469v1, Oct. 20, 2020, 16 pages.

Zhan et al., "Optimizing Dense Retrieval Model Training with Hard Negatives", arXiv:2104.08051, Apr. 16, 2021, 10 pages.

Zhang et al., "Understanding Hard Negatives in Noise Contrastive Estimation", arXiv:2104.06245v1, Apr. 13, 2021, 12 pages.

* cited by examiner

<u>12</u>

Initialize embedding table that includes item embeddings for at least a portion of a plurality of candidate items Obtain training example from training dataset, where training example includes a query and one or more positive items of the plurality of candidate items Process query with embedding model to generate a query embedding for the query Process the one or more positive items with embedding model to respectively generate one or more positive embeddings Update embedding table to include the one or more positive embeddings for the one or more positive items Generate a plurality of similarity scores for the query embedding with respect to at least a portion of the plurality of item embeddings included in the embedding table Sample from the plurality of candidate items based at least in part on the plurality of similarity scores to select one or more sampled items Process the one or more sampled items with the embedding model to generate one or more sampled item embeddings Generate one or more similarity scores for the query embedding with respect to the one or more sampled item embeddings Determine a gradient of a loss function based on the similarity scores generated for the query embedding with respect to at least a portion of the positive items and at least a portion of the sampled items Update one or more values of one or more parameters of the embedding model based on the gradient of the loss function Replace at least a fraction of the embeddings in the embedding table using the updated embedding model

Figure 1

TRAINING EMBEDDING MODELS USING A STALE EMBEDDING CACHE FOR NEGATIVE SAMPLING

RELATED APPLICATIONS

This application claims priority to and the benefit of U.S. Provisional Patent Application No. 63/277,385, filed Nov. 9, 2021. U.S. Provisional Patent Application No. 63/277,385 is hereby incorporated by reference in its entirety.

FIELD

The present disclosure relates generally to machine learning. More particularly, the present disclosure relates to efficient training of embedding models (e.g., embedding-based retrieval models) using a negative cache.

BACKGROUND

Learning to represent objects as numerical vectors (e.g., dense vectors), often called "embeddings", has proved to be crucial in large scale information retrieval tasks from multiple domains including, among other domains, vision and natural language processing.

A popular paradigm for such learning tasks involves training two separate neural networks (often called two-towers or dual-encoders), each representing a query and a document. Given positive and negative (query, document) pairs, the learning task trains the two networks by minimizing a loss function, usually softmax cross-entropy, to encourage positive pairs to have higher similarity scores and negative pairs to have lower scores.

While it is easy to sample positive pairs of examples through user feedback such as impressions, clicks, or other forms of inferred approval, it is more challenging to sample good negative pairs from a pool of potentially millions or even billions of documents. A large number of negative pairs is often required to ensure high quality of the final model, which makes the training process consume significant computational resources.

A number of strategies have been proposed in the literature to address the problem of sampling good negative pairs from a large corpus. The most common approach is to use in-batch negatives, which treats random, non-positive pairs in a minibatch as negatives. This approach is computationally efficient and works in a streaming setting, but the pool of negative examples is limited to the minibatch. Towards the later stages of the training, the in-batch negatives become less informative (i.e., have low gradients) since they are sampled randomly without paying attention to which negatives are hard for a given query.

Another popular approach is to maintain an asynchronous retrieval index of the full dataset for negative sampling. Negatives from the full dataset can be extracted based on approximate retrieval techniques such as ScaNN, Faiss, or SPTAG. However, it requires coordinating with a separate process for re-indexing and re-building the retrieval index at each learning iteration, which is not only computationally expensive and hard to maintain but also suffers from the problem of stale index.

SUMMARY

Aspects and advantages of embodiments of the present disclosure will be set forth in part in the following description, or can be learned from the description, or can be learned through practice of the embodiments.

One example aspect is directed to a computer-implemented method for training embedding models with improved efficiency, the method comprising: for a plurality of training iterations: processing, by a computing system, a query with an embedding model to generate a query embedding for the query; accessing, by the computing system, an embedding table that stores a plurality of item embeddings for at least a portion of a plurality of candidate items, wherein the item embedding for at least one of the plurality of candidate items was generated by a previous version of the embedding model in one or more previous iterations; generating, by the computing system, a plurality of similarity scores for the query embedding with respect to at least a portion of the plurality of item embeddings included in the embedding table; sampling, by the computing system, from the plurality of candidate items based at least in part on the plurality of similarity scores to select one or more sampled items; processing, by the computing system, the one or more sampled items with the embedding model to respectively generate one or more sampled item embeddings; generating, by the computing system, one or more similarity scores for the query embedding with respect to the one or more sampled item embeddings; and updating, by the computing system, one or more values of one or more parameters of the embedding model based at least in part on the similarity scores generated for the query embedding with respect to at least a portion of the sampled item embeddings; and after the plurality of training iterations, providing, by the computing system, the embedding model as an output.

In some implementations, sampling, by the computing system, from the plurality of candidate items based at least in part on the plurality of similarity scores comprises performing, by the computing system, a Gumbel-Max sampling technique to sample from the plurality of candidate items based at least in part on the plurality of similarity scores.

In some implementations, the embedding table is stored in a memory portion of a hardware accelerator.

In some implementations, the method further includes: prior to processing the query with the embedding model: obtaining, by the computing system, a training example from a training dataset, wherein the training example comprises the query and one or more positive items labeled as positive results for the query, the one or more positive items being a subset of the plurality of candidate items; and prior to generating the plurality of similarity scores: processing, by the computing system, the one or more positive items with the embedding model to respectively generate one or more positive embeddings for the one or more positive items; and updating, by the computing system, the embedding table to include the one or more positive embeddings for the one or more positive items of the plurality of candidate items.

In some implementations, updating, by the computing system, the one or more values of the one or more parameters of the embedding model comprises updating, by the computing system, the one or more values of the one or more parameters of the embedding model based at least in part on the similarity scores generated for the query embedding with respect to at least a portion of the positive items and at least the portion of the sampled items.

In some implementations, updating, by the computing system, the one or more values of the one or more parameters of the embedding model comprises: determining, by the computing system, an approximate gradient of a cross-entropy loss based on the similarity scores generated for the query embedding with respect to at least a portion of the sampled item embeddings; and updating, by the computing system, the one or more values of the one or more parameters of the embedding model based at least in part on the approximate gradient of the cross-entropy loss.

In some implementations, the embedding table comprises a full document cache that stores item embeddings for all of the plurality of candidate items.

In some implementations, the method further includes, for each iteration: removing, by the computing system, from the embedding table the item embeddings associated with a fraction of the candidate items; and replacing, by the computing system, the item embeddings that were removed from the embedding table with new item embeddings generated for the fraction of the candidate items.

In some implementations, the embedding table comprises a streaming cache that stores item embeddings for fewer than all of the plurality of candidate items.

In some implementations, the method further includes for each iteration: removing, by the computing system, from the embedding table the item embeddings associated with a fraction of the candidate items; sampling, by the computing system, newly sampled items from the plurality of candidate items; and replacing, by the computing system, the item embeddings that were removed from the embedding table with new item embeddings generated for newly sampled items.

In some implementations, the embedding model comprises a two-tower dual encoding model that comprises a query encoder and an item encoder.

In some implementations, the plurality of candidate items comprise: images; textual documents; web documents; products; videos; or entities.

In some implementations, the query comprises: a textual query; a voice query; or an image query.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1 depicts a flow chart diagram of an example method to perform more efficient training of an embedding model according to example embodiments of the present disclosure.

Figure 2A:
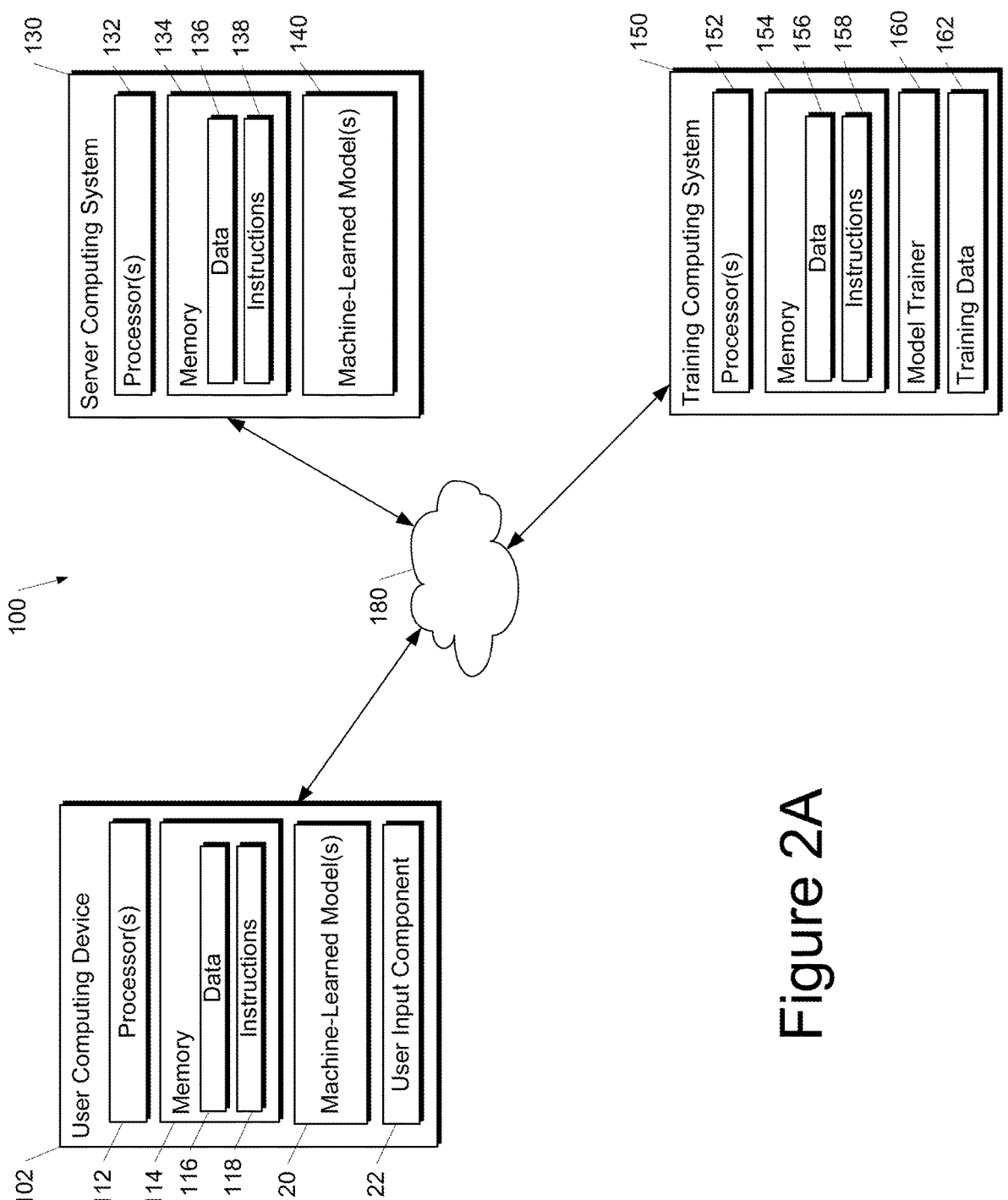
FIG. 2A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to systems and methods which more efficiently train embedding models through the use of a cache of item embeddings for candidate items over a number of training iterations. The cached item embeddings can be "stale" embeddings that were generated by a previous version of the model at a previous training iteration. Specifically, at each iteration, the (potentially stale) item embeddings included in the cache can be used when generating similarity scores that are the basis for sampling a number of items to use as negatives in the current training iteration. For example, a Gumbel-Max sampling approach can be used to sample negative items that will enable an approximation of a true gradient. New embeddings can be generated for the sampled negative items and can be used to train the model at the current iteration.

By re-using stale item embeddings from previous iteration(s) to guide the sampling of the negative items at the current iteration, the systems and methods of the present disclosure can avoid needing to re-compute embeddings for an entire vocabulary of items at each iteration, thereby conserving significant amounts of computational resources, such as processor usage, memory usage, network bandwidth, etc. Furthermore, example implementations of the present disclosure can leverage a streaming cache that, at any given iteration, contains embeddings for fewer than all of the possible items. Use of a streaming cache in such fashion can enable the embedding cache to be retained within the memory of a hardware accelerator (e.g., graphics processing unit, tensor processing unit, etc.), thereby greatly improving the speed and computational efficiency at which training of the model can be performed.

More particularly, embedding models (e.g., factorized models, such as two tower neural network models) are widely used for scoring (query, document) pairs in information retrieval tasks. These models are typically trained by optimizing the model parameters to score relevant "positive" pairs higher than the irrelevant "negative" ones. While a large set of negatives typically improves the model performance, limited computation and memory budgets place constraints on the number of negatives used during training.

In view of these challenges, the present disclosure provides a novel negative sampling technique for accelerating training (e.g., training that leverages a softmax cross-entropy loss). By using cached (possibly stale) item embeddings, the proposed techniques enables training with a large pool of negatives with reduced memory and computation. The present disclosure also provides a streaming variant of the proposed algorithms geared towards very large datasets. For example, some implementations that update only a very small fraction of the cache at each iteration can still ensure fast convergence. The proposed approaches are efficient and compare favorably with more complex, state-of-the-art approaches.

Thus, one aspect of the present disclosure is directed to an approach to train retrieval models with cross-entropy loss using a large negative cache. For example, some implementations can utilize Gumbel-Max sampling on the cached embeddings to efficiently sample the negatives. Analysis of the convergence of example implementations of the proposed algorithm in terms of the refresh rate of the cache shows that, even for a small refresh rate, the example implementations can obtain a first-order convergence rate comparable to that of getting exact gradients using the entire dataset. Another aspect of the present disclosure is directed to a streaming version of the proposed approach. Example implementations of the streaming algorithm allow the approach to scale to very large datasets and avoid needing to maintain an up-to-date index for nearest neighbor search (or maximum inner product search). Experimental validations of example implementations using the MS MARCO and TREC 2019 passage retrieval tasks show that the example implementations can be efficiently implemented and achieve statistical performance comparable to state-of-the-art benchmarks with a computationally simpler approach that requires only a fraction of the memory.

With reference now to the Figures, example embodiments of the present disclosure will be discussed in further detail.

Example Encoders

Example Dual Encoders

Given a query q, one goal is to match the query with the most relevant documents. The set of documents is represented by $D=\{z_1, z_2, \ldots, z_m\} \in \mathbb{R}^{dD}E$, where m is the total number of documents. While example descriptions herein refer to these items using the term documents, the items can be any set of items that the system is configured to retrieve e.g., movies, products, content, web pages, people, entities, etc.

The training data consists of n positive (query, doc) pairs $T=\{(q_1, y_1), (q_2, y_2), \ldots (q_n, y_n)\}$, where $q_i$ is a feature vector in $\mathbb{R}^{dQ}$ and the label $y_i$ is an integer in [m], which indicates a relevant document for query $q_i$. One example goal is to learn a dual encoder model for embedding the queries and documents. Formally, a dual encoder can include two components:

1. Query encoder $\varphi_Q$: $\mathbb{R}^{dQ} \mapsto \mathbb{R}^d$, which maps a query to a d-dimensional embedding space.

2. Document encoder $\varphi_D$: $\mathbb{R}^{dD} \mapsto \mathbb{R}^d$, which maps a document to the embedding space.

The score for a particular query, document pair can in some examples be computed as an inner product of the corresponding query and document embeddings i.e., $s(q,z)=\varphi_Q(q)\cdot\varphi_D(z)$. Intuitively, this represents the "similarity" between the query and documents in the embedding space. The model can be trained such that the relevant query, document pairs have high scores. Dual encoders are popular in large scale settings since they are highly efficient during training and inference as the high scoring items for a given query can be found using efficient nearest neighbors algorithms, often achieving more than 100× speed up over brute force search.

Example Training of Dual Encoders with Cross-Entropy Loss

One popular loss for training dual encoders is the cross-entropy loss. Even though these loss functions have been found to be highly effective, the main challenge in large scale settings is computational. To observe the computational bottleneck, consider the cross-entropy loss:

$$\mathcal{L}_{CE_i}(\theta) = -\log\left(\frac{\exp(\beta s_{iy_i})}{\sum_{j=1}^{m} \exp(\beta s_{jy_j})}\right), \tag{1}$$

where $\beta$ is the inverse temperature that scales the scores.

Here, $s_{ij}=s_{ij}(\theta)=\varphi_Q(q_i;\theta)\cdot\varphi_D(z_{yi};\theta)$ and $\theta \in \mathbb{R}^P$. This computation involves computing the scores for all documents, which can be prohibitively expensive when the number of documents m is large. For simplicity, throughout the description contained herein it is assumed that the embeddings have unit bounded norms, i.e., $\|\varphi_Q(\bullet;\theta)\|_2 \leq 1$ and $\|\varphi_D(\bullet;\theta)\|_2 \leq 1$ for all $\theta \in \mathbb{R}^P$. Note that this can be assumed without a loss in generality since one can adjust the inverse temperature $\beta$ accordingly to compensate for the scale.

On large-scale datasets, it may not be possible to have the entire dataset in memory, especially with large embedding models where the activations of the intermediate layers are persisted for back-propagation. An alternative approach is to first select a sample of documents S and use them to approximate the partition function. We thus have the following loss function:

$$\mathcal{L}_{SAMPLE-CE_i}(\theta) = -\log\left(\frac{\exp(\beta s_{iy_i})}{\sum_{j \in S} \exp(\beta s_{jy_j})}\right). \tag{2}$$

It has been observed that using a larger set of negative samples leads to better performance. A simple approach is to uniformly sample this set from $\mathcal{D}$ (popularly referred to as negative sampling). However, when m is large, negative sampling is typically inefficient since it is difficult to obtain high-scoring irrelevant documents, thereby providing a poor approximation of the cross-entropy loss. The following sections explore highly scalable solutions for optimizing cross-entropy loss.

Random sampling is often implemented using in-batch negative sampling. However, this approach is not scalable because a huge amount of accelerator memory is required to achieve a bigger pool of in-batch negatives. For example, BERT based transformers are typically used in NLP tasks but a single pair of (query, document) BERT-base consumes 600 MB of accelerator memory during training. This further limits the effectiveness of random negative sampling.

Example Application to Full Document Cache

One primary objective is to find the parameters $\theta^*$ that minimize the softmax cross-entropy loss $\mathcal{L}_{CE}(\theta)$ (Equation 1). The standard algorithm to optimize the loss is stochastic gradient descent (or its variants). However, calculating stochastic gradients for this loss function is expensive in terms of both time and memory. Computation of the gradient involves: (1) a forward pass on every document in our dataset, (2) storing all intermediate activations (which are needed for the backward pass), and (3) calculating the gradients in the backward pass. Unfortunately, for large embedding encoder models such as those based on Transformers, this is typically prohibitively expensive. For instance, for a large BERT model on 1 million documents, the required memory would be hundreds of terabytes.

The present disclosure proposes example approaches that can approximate the gradient of cross-entropy loss without needing to embed every document, thereby reducing the per-iteration computation and memory requirements for gradient computation. Some example approaches leverage cached embeddings. To understand the example approaches, this section first starts with gradient estimation with Gumbel-Max sampling. The following known fact shows that if we can sample from the softmax distribution then we can get an unbiased estimate of the stochastic gradient.

Fact 1 The gradient of the cross-entropy has the following form:

$$\nabla \mathcal{L}_{CE_i} = -\beta \nabla s_{iy_i} + \sum_{j=1}^{m} p_{ij} \beta \nabla s_{ij},$$

where $$\mathcal{L}_{CE_i} = -\log\left(\frac{\exp(\beta s_{iy_i})}{\sum_{j=1}^{m} \exp(\beta s_{ij})}\right) \text{ and } p_{ij} = \frac{\exp(\beta s_{ij})}{\sum_{j'=1}^{m} \exp(\beta s_{ij'})}.$$

If J is a sample from $p_i=(p_{i1}, p_{i2}, \ldots, p_{im})$, we have $\nabla \mathcal{L}_{CE_i}=-\beta\nabla s_{iy_i}+\beta E[\nabla s_{iJ}]$. Further, if $N_1, N_2, \ldots, N_m$ are i.i.d. standard Gumbel random variables, then the index arg $\max_{j\in[m]}\beta s_{ij}+N_j$ is a sample from the distribution $p_i=(p_{i1}, p_{i2}, \ldots, p_{im})$.

This approach can be referred to as Gumbel-Max sampling and GumbelMaxSample($\beta$s) can be used to represent this sampling procedure. A natural estimator of the gradient is $\nabla \hat{\mathcal{L}}_{CE_j}=-\beta s_{iy_i}+\beta\nabla s_{iJ}$ where J is the index in [m] obtained through Gumbel-Max sampling. Due to the feasibility of fast maximum inner product search (MIPS), Gumbel-Max sampling is an efficient way to sample from the softmax distribution; this, thereby, provides an efficient way to obtain an unbiased estimate of the gradient. In particular, the per-iteration memory requirement is reduced from O(m$\tau$) to O(md) where i and d are the model and embedding sizes respectively. This is due to the fact that the intermediate activations need to be stored only for documents $y_i$ and J, the negative obtained through Gumbel-Max sampling. When d<<$\tau$ (which is typically the case while using large transformer models), this leads to a significant reduction in memory requirements. While the memory requirements are reduced drastically, we still need to do a forward pass on all documents to compute the scores $s_{ij}$. Using Fact 1, an example system would need to embed every document every iteration, which is still computationally intensive.

This motivates an algorithm where previously calculated embeddings are cached to efficiently approximate the softmax distribution $p_i$. First note the structure of the $s_{ij}=\phi_Q(q_i;\theta)\cdot\phi_D(z_j;\theta)$. The key computational challenge in Gumbel-Max sampling is computation of the embeddings $\phi_D(z_j;\theta)$ for all $j\in[m]$. This is required to find the index J in Fact 1, which essentially renders it computationally intractable for large m. Our approach is to compute embeddings $\phi_D(z_j;\theta)$ for only a few documents $j\in[m]$ at each iteration and reuse the previously computed embeddings for the rest of the documents. In particular, let $z_j=\phi_D(z_j;\theta)$ be the current embedding of a document and $\tilde{z}_j=\phi_D(z_j;\bar{\theta})$ be its previous embedding. If $\theta$ and $\bar{\theta}$ are reasonably close, then $z_j$ and $\tilde{z}_j$ would be similar. In such a scenario, the scores $s_{ij}$ and $\tilde{s}_{ij}$, and, thereby the corresponding distributions $p_i=(p_{i1}, p_{i2}, \ldots, p_{im})$ and $\tilde{p}_i=(\tilde{p}_{i1}, \tilde{p}_{i2}, \ldots, \tilde{p}_{im})$ are also similar. As a consequence, the true gradient $$\nabla \mathcal{L}_{CE_i} = -\beta \nabla s_{iy_i} + \sum_{j=1}^{m} p_{ij} \beta \nabla s_{ij}$$

and the approximation to the gradient $$-\beta \nabla s_{iy_i} + \sum_{j=1}^{m} \tilde{p}_{ij} \beta \nabla s_{ij}$$

should be similar. Note that for the approximation we take the gradient of $s_{ij}$ and not $\tilde{s}_{ij}$; we only replace the weight terms $p_{ij}$ with $\tilde{p}_{ij}$.

An example of this algorithm is provided below as Algorithm 1. Although the algorithm is presented with a batch size of 1—it can be easily extended to larger batches. An embedding table of all documents can be maintained. At each iteration, update only a small fraction $\rho$ of the stale embeddings are updated to ensure that $p_i$ and $\tilde{p}_i$ are similar. Using this approach, approximately sampling from this distribution using Gumbel-Max sampling can be performed in an efficient manner.

---

Algorithm 1

Cached Gumbel-Max Gradient Descent

---

Input: Learning rate $\eta$, Document refresh fraction $\rho \in (0,1]$
Initialize parameters $\theta_0$.
Initialize embeddings table E: $E_j \leftarrow \phi_D(z_j; \theta_0)$ for all $j \in [m]$
for $t \in 0,1, \ldots, T-1$ do
    Sample $q_i$, $y_i$ from the training set
    $e_{q_i} \leftarrow \phi_Q(q_i; \theta_t)$ $e_{z_{y_i}} \leftarrow \phi_D(z_{y_i}; \theta_t)$ and update $E_{y_i} = e_{z_{y_i}}$ Calculate scores $\tilde{s}_{ij} \leftarrow e_{q_i} \cdot E_j$ for all $j \in [m]$
    $J \leftarrow$ GumbelMaxSample($\beta\tilde{s}_i$)
    $e_{z_J} \leftarrow \phi_D(z_J; \theta_t)$
    $s_{iJ} \leftarrow e_{q_i} \cdot e_{z_J}$
    $g_t \leftarrow -\beta\nabla s_{iy_i} + \beta\nabla s_{iJ}$
    $\theta_{t+1} \leftarrow \theta_t - \eta g_t$
    Select oldest $\rho$m embeddings of E and update them to
    $E_j \leftarrow \phi_D(z_j; \theta_{t+1})$
end for

---

Example Theoretical Results

This section establishes error guarantees on the error of example implementations of the Cached Gumbel-Max gradient approximation. Before delving into the technical details, we state the following example assumptions on the query and document encoder.

Assumption 1 The following conditions hold for the query $\phi_Q$ and document encoder $\phi_D$:

A1 The query and document encoder functions are both L-Lipschitz in the parameters $\theta$. In particular, we have $\|\phi(q_i;\theta)-\phi(q_i;\theta')\|_2\le L\|\theta-\theta'\|_2$ for all $i\in[n]$ and $\|\phi(z_i;\theta)-\phi(z_i;\theta')\|_2\le L\|\theta-\theta'\|_2$ for all $i\in[m]$.

A2 The query and document embeddings are bounded i.e., we have $e_q$, $e_z=\phi_Q(q;\theta),\phi_D(z;\theta)$ satisfy $\|e_q\|_2$, $\|e_z\|_2\le 1$.

A3 The score functions have bounded gradients i.e., we have $\|\nabla s_{ij}\|_2\le M$ for all $i\in[n]$ and $j\in[m]$.

All of these assumptions are fairly mild and are common in optimization literature. As noted earlier, the second assumption does not lead to much loss of generality as a larger bound on the norm can be absorbed into the inverse temperature parameter $\beta$. In the following result, it is first shown that the error can be bounded by the $\ell_\infty$ error between the true scores and the scores with the cached embeddings. It is then shown that if the cached embeddings are generated from Algorithm 1 with learning rate $\eta$ and refresh rate $\rho$, we can bound the gradient error at each iteration.

Theorem 2 Let $\theta_t$ and index i be the parameters and training point selected at $t^{th}$ iteration of Algorithm 3, respectively. Let. J represent the Gumbel-Max index selected at that iteration. Then, under Assumption 1, we have the following gradient approximation with the cached embeddings $$\nabla \tilde{\mathcal{L}}_{CE_i}(\theta_t) = \mathbb{E}_J[g_t] = -\beta \nabla s_{iy_i} + \sum_{j=1}^{m} \tilde{p}_{ij} \beta \nabla s_{ij},$$

where $$\tilde{p}_{ij} = \frac{\exp(\beta \tilde{s}_{ij})}{\sum_{j'=1}^{m} \exp(\beta \tilde{s}_{ij'})} \text{and } \tilde{s}_{ij} = e_{q_i} \cdot \varepsilon_j.$$

Furthermore, we have the following bound on the gradient approximation of $\nabla \mathcal{L}_{CE_i}(\theta_t)$:

$$\|\nabla \mathcal{L}_{CE_i}(\theta_t) - \nabla \hat{\mathcal{L}}_{CE_i}(\theta_t)\|_2 \leq 2\beta^2 M \|\tilde{s}_i - s_i\|_\infty.$$

When parameter updates are generated by Algorithm 1 with step size $\eta$ and update rate $\rho$, we have $$\|\nabla \mathcal{L}_{CE_i}(\theta_t) - \nabla \tilde{\mathcal{L}}_{CE_i}(\theta_t)\|_2 \leq 4\eta \beta^3 LM^2 \left(\frac{1}{\rho} - 1\right).$$

We see that the error can be controlled by either increasing the refresh rate or decreasing the gradient norm. This provides a bound on the bias in the gradient approximation. Using the above result, the following first-order convergence guarantees can be shown. For proving convergence, the following additional assumption is used.

Assumption 2 Assume loss function $\nabla \mathcal{L}_{CE_i}$ is S-smooth i.e., we have $\|\nabla \mathcal{L}_{CE_i}(\theta) - \nabla \mathcal{L}_{CE_i}(\theta')\|_2 \leq S \|\theta - \theta'\|_2$ holds for all $\theta, \theta' \in \mathbb{R}^p$ and $i \in [n]$.

Under the above assumption, we have the following convergence result in general non-convex settings.

Theorem 3 Suppose we run Algorithm 1 for T iterations with stepsize $$\eta = \frac{\sqrt{\mathcal{L}_{CE}(\theta_0) - \mathcal{L}_{CE}(\theta^*)}}{\sqrt{2TS} M}.$$

Then under Assumption 1 and 2, we have the following:

$$\frac{1}{T}\sum_{t=0}^{T} \mathbb{E}\left[\|\nabla \mathcal{L}_{CE}(\theta_t)\|_2^2\right] \leq$$

$$4M \sqrt{\frac{S(\mathcal{L}_{CE}(\theta_0) - \mathcal{L}_{CE}(\theta^*))}{T}} + \frac{4\beta^6 L^2 M^2 (\mathcal{L}_{CE}(\theta_0) - \mathcal{L}_{CE}(\theta^*))}{ST}\left(\frac{1}{\rho} - 1\right)^2.$$

We have that $-2\beta + \log m \leq \mathcal{L}_{CE}(\theta) \leq 2\beta + \log m$. Thus the term $\mathcal{L}_{CE}(\theta_0) - \mathcal{L}_{CE}(\theta^*) \leq 4\beta$.

It can be observed that the bias introduced due to stale embeddings is a lower order term in the bound of Theorem 3. In particular, one can use $$\rho = \frac{1}{1 + T^{1/4}}$$

without affecting the convergence rate of the standard SGD algorithm. For a large T (which is typical in machine learning settings), this can have a significant impact on the computational complexity since a very small fraction of the documents need to be updated at each iteration.

Example Computational Discussion

Some example implementations can store the cache using accelerator memory. This prevents the need to have a separate task that constantly reindexes the embeddings as they change throughout training. This is feasible for moderate size datasets. For instance, 1 million training points with an embedding dimension of 512 and feature vector dimension of 1024 will use about 6 GB memory, which can fit on a single accelerator. To calculate the perturbed nearest neighbor for Gumbel-Max sampling, a system can simply brute force calculate the largest dot product. Accelerators such as GPUs and TPUs can do this very efficiently—in example experiments it is demonstrated that the steps/second increases only a small amount as the cache size is increased. This is because the cost of computing the embeddings is much larger than the cost of doing the search due to the complexity of large transformer models.

If faster sampling is needed, it can be accelerated by using fast nearest neighbor search. One example approach applies Gumbel perturbations to the k highest scoring elements plus a small number of random elements to perform Gumbel-Max sampling in sublinear time.

However, having the cache on an accelerator has limitations due to the accelerator memory limits. The next section modifies Algorithm 1 to be a streaming algorithm.

Example Conditional Sampling Negatives

Note that Gumbel-Max sampling has a chance to sample the positive element. If this happens, then the gradient approximation is zero. Since example implementations train the model to make the score of the positive element large, this can happen often. Provided is an approach to force the sampled element to be a negative element while maintaining a similar expected gradient.

Assume that the positive element is $z_1$ and the negative elements are $z_2, z_3, \ldots, z_m$. We have that $$\nabla \mathcal{L}_{CE_i} =$$

$$-\beta \nabla s_{i1} + \sum_{j=1}^{m} p_{ij}\beta \nabla s_{ij} = -\beta(1 - p_{i1})\nabla s_{i1} + (1 - p_{i1})\sum_{j=2}^{m} \frac{p_{ij}}{1 - p_{i1}}\beta \nabla s_{ij}.$$

Note that $$\left(\frac{p_{i2}}{1 - p_{i1}}, \frac{p_{i3}}{1 - p_{i1}}, \ldots, \frac{p_{im}}{1 - p_{i1}}\right)$$

is the conditional distribution where we condition on not sampling the first element. Thus we can sample from the conditional distribution as long as we properly scale the gradient by $1 - p_{i1}$. We note that the value of $p_{i1}$ depends on the negative embeddings. Since we have all the negatives on our accelerator, we can also calculate the partition function without much additional compute, as it has the same complexity as of our nearest neighbor search.

Example Applications to Streaming Cache

For very large datasets, the Gumbel-Max sampling step can become difficult. If the embedding vectors are stored in accelerator memory, then only a finite number of vectors can be stored on a fixed computational budget. If the vectors are stored in CPU memory with a CPU-based retrieval system, then the nearest neighbor index needs to be constantly recreated, which is computationally expensive for large datasets. Additionally, we see in Theorem 2 that as the fraction of elements refreshed each iteration $\rho$ decreases, then the learning rate needs to decrease as well to maintain a given bias in gradient estimation. Alternatively, more embeddings will need to be refreshed each iteration as the size of the dataset grows.

To address this issue, some example implementations can perform a streaming variant of the algorithms proposed herein. One difference with respect to the full dataset setting is that instead of storing all the document embeddings in memory, some streaming implementations store only a sample multiset $S$ of size am. After every iteration some example implementations can remove the oldest pam elements in $S$ and replace them with pam new elements sampled uniform i.i.d. from the dataset. The fraction $\alpha$ can be tuned to fit a given computational budget.

An example gradient estimator approximates gradients from a cache cross-entropy loss. As an example, the cache cross-entropy loss can be defined to be the following:

$$\mathcal{L}_{CacheCEi} = -\log \frac{\exp(\beta s_{y_i})}{\exp(\beta s_{iy_i}) + \frac{1}{\alpha}\sum_{j\in S, j\neq y_i} \exp(\beta s_{ij})}$$

Some example implementations scale the weight of the negative elements by $$\frac{1}{\alpha},$$

otherwise the partition function would underestimate the true partition function. This is equivalent to shifting the scores of the negative elements by $$\frac{1}{\beta}\log\frac{1}{\alpha}.$$

The use of the cache cross-entropy loss $\mathcal{L}_{CacheCE}$ instead of the true cross entropy loss induces a bias in gradient estimation. It can be shown that the bias scales inversely with the cache size.

Lemma 4 Assume Assumptions A2 and A3 hold, i.e., that the norm of the encoder embeddings is bounded by 1 and the norm of the gradients of the scores is bounded by M.

We have that $$\|\nabla \mathcal{L}_{CEi} - E[\nabla \mathcal{L}_{CacheCEi}]\|_2 \leq \frac{\exp(O(\beta))M}{\alpha m},$$

where the expectation is taken over the randomness of the elements in the cache.

Algorithm 2 provided below is an example algorithm for training with the streaming cache. Algorithm 2 uses GumbelMaxSample($\beta$s, $S$) to denote the Gumbel-Max sampling described in Fact 1 with scores restricted to documents in set $S$.

---

Algorithm 2

Streaming Cached Gumbel-Max Gradient Descent

---

Input: Learning rate $\eta$, Cache fraction $\alpha \in (0,1]$, Document refresh fraction $\rho \in (0,1]$
Initialize parameters $\theta_0$.
Random sample $S \subseteq [m]^{\alpha m}$.
Initialize embeddings table E: $E_j \leftarrow \phi_D(z_j; \theta_0)$ for all $j \in S$
for $t \in 0, 1, \ldots, T-1$ do
    Sample $q_i$, $y_i$ from the training set
    $e_{q_i} \leftarrow \phi_Q(q_i; \theta_t)$ $e_{z_{y_i}} \leftarrow \phi_D(z_{y_i}; \theta_t)$ and update $E_{y_i} = e_{z_{y_i}}$ Calculate scores $\tilde{s}_{ij} \leftarrow e_{q_i} \cdot E_j + \log(1/\alpha)/\beta$ for all $j \in S$ and
    $\tilde{s}_{iy_i} = e_{q_i} \cdot e_{z_{y_i}}$ $\hat{S} \leftarrow S$ with all instances of $y_i$ removed
    $J \leftarrow$ GumbelMaxSample($\beta\tilde{s}_i$, $\hat{S}$)
    $e_{z_J} \leftarrow \phi_D(z_J; \theta_t)$
    $s_{iJ} \leftarrow e_{q_i} \cdot e_{z_J}$
    $p_{y_i} \leftarrow$ probability of $y_i$ under softmax($\tilde{s}_i$)
    $g_t \leftarrow \beta(1 - p_{y_i})(-\nabla s_{iy_i} + \nabla s_{iJ})$
    $\theta_{t+1} \leftarrow \theta_t - \eta g_t$
    Select oldest $\rho\alpha m$ embeddings set O of E and remove them from E
    Sample $S' \subseteq [m]$, $|S'| = \rho\alpha m$
    Update $E_j \leftarrow \phi_D(z_j; \theta_{t+1})$ for $j \in S'$
    Update set $S \leftarrow S - O \cup S'$
end for

---

There are two sources of bias in example implementations of the gradient estimate: first due to the staleness of the cache and the second due to using a sampled set of negatives rather than the entire dataset. We handle the latter in Lemma 4. For the former, note that our error guarantees in Theorem 2 still apply to the streaming cache, as we can bound the error between true gradient using this set of negatives with our gradient approximation. This allows us to bound the bias due to the staleness of the cache.

Since we were able to control the bias of our gradient estimator even with the streaming cache, we can establish a first order convergence theorem for training with Algorithm 2.

Theorem 5 Assume that Assumptions 1 and 2 hold and we use a learning rate $$\eta = \frac{\sqrt{\mathcal{L}_{CE}(\theta_0) - \mathcal{L}_{CE}(\theta^*)}}{\sqrt{2TS}M}.$$

Running Algorithm 2 with a cache of size am with a refresh rate $\rho$ creates updates $\theta_1, \theta_2, \ldots, \theta_T$ such that $$\frac{1}{T}\sum_{t=0}^{T} E\left[\|\nabla \mathcal{L}_{CE}(\theta_t)\|_2^2\right] \leq O\left(\frac{1}{\sqrt{T}} + \frac{1}{\alpha^2 m^2} + \frac{1}{T}\left(\frac{1}{\rho} - 1\right)^2\right),$$

where we omit terms that depend on S, L, M, and $\beta$.

If the cache size satisfies $\alpha m \geq T^{1/4}$, then we do not asymptotically affect the rate of convergence.

It can be seen that using a streaming cache smaller than the entire dataset adds only a small amount of bias in convergence and reduces the computational burden of storing embeddings and calculating nearest neighbors significantly.

Example Methods

FIG. 1 depicts a flow chart diagram of an example method according to example embodiments of the present disclosure. Although FIG. 1 depicts steps performed in a particular order for purposes of illustration and discussion, the methods of the present disclosure are not limited to the particularly illustrated order or arrangement. The various steps of the method 12 can be omitted, rearranged, combined, and/or adapted in various ways without deviating from the scope of the present disclosure.

At 14, a computing system can initialize an embedding table that includes item embeddings for at least a portion of a plurality of candidate items. For example, the candidate items can correspond to textual documents, web documents, natural language tokens, images, products, videos, movies, books, users, entities, locations, businesses, and/or any other items.

In some implementations, the embedding table is stored in a memory portion (e.g., video random access memory, on-chip memory, high bandwidth memory, etc.) of a hardware accelerator. Example hardware accelerators include graphics processing units, tensor processing units, or other application-specific integrated circuits.

As one example, the embedding table can be a full document cache that stores item embeddings for all of the plurality of candidate items. Thus, the cache can contain embeddings (potentially stale) for all of the possible items.

As another example, the embedding table can be a streaming cache that stores item embeddings for fewer than all of the plurality of candidate items. For example, the streaming cache can store, at any given time, a cache fraction of the total number of candidate items. The cache fraction can be a hyperparameter that can, for example, be user-specified. Maintaining the embedding table as a streaming cache can facilitate storage of the embedding table in a memory-constrained location such as, for example, in various on-device environments and/or in the memory portion of a hardware accelerator.

At 16, the computing system can obtain a training example from a training dataset. The training example can include a query and one or more positive items labeled as positive results for the query. The one or more positive items are a subset of the plurality of candidate items. In some implementations, the query can be a textual query, a voice query, or an image query. In some implementations, the query can itself be one of the plurality of candidate items. In some examples, the one or more positive items can be inferred from and/or labeled on the basis of feedback data such as impressions data, click through data (e.g., click through rate), eye gaze data, explicit user feedback, co-click data, co-usage data, and/or forms of feedback data or other data from which a relatedness between the query and the positive item(s) can be inferred or established.

At 18, the computing system can process the query with an embedding model to generate a query embedding for the query. At 20, the computing system can process the one or more positive items with the embedding model to respectively generate one or more positive embeddings.

For example, the embedding model can include one or more component models that are configured to receive an input and produce an embedding for the input in a latent embedding space. Example embedding models can include various neural networks such as feed-forward neural networks, recurrent neural networks, transformer-style neural networks, convolutional neural networks, etc.

One example embedding model can be or include a two-tower dual encoding model that includes a query encoder and an item encoder. The query encoder can be configured to generate embeddings for queries while the item encoder can be configured to generate embeddings for items (e.g., positive and/or negative items).

At 22, the computing system can update the embedding table to include the one or more positive embeddings for the one or more positive items.

At 24, the computing system can generate a plurality of similarity scores for the query embedding with respect to at least a portion of the plurality of item embeddings included in the embedding table. As examples, a similarity score for a pair of embeddings can be equal to or based on a distance between the pair of embedding. The distance can be an L1 distance, an L2 distance, or other form of distance. In one specific example, a similarity score for a pair of embeddings can be generated by determining the inner product between the pair of embeddings.

At 26, the computing system can sample from the plurality of candidate items based at least in part on the plurality of similarity scores to select one or more sampled items. As one example, the computing system can perform a Gumbel-Max sampling technique to sample from the plurality of candidate items based at least in part on the plurality of similarity scores. In other examples, vanilla sampling techniques can be used, but may have less impressive results. In other examples, sampling techniques from the REALM and/or ANCE techniques can be performed.

At 28, the computing system can process the one or more sampled items with the embedding model to generate one or more sampled item embeddings. In some implementations, the computing system can update the embedding table to include the one or more sampled item embeddings for the one or more sampled items.

At 30, the computing system can generate one or more similarity scores for the query embedding with respect to the one or more sampled item embeddings generated at 28.

At 32, the computing system can determine a gradient of a loss function based on the similarity scores generated for the query embedding with respect to at least a portion of the positive items and at least a portion of the sampled items. As one example, determining the gradient at 32 can include determining an approximate gradient of a cross-entropy loss based on the similarity scores generated for the query embedding with respect to at least a portion of the positive items and at least a portion of the sampled items.

At 34, the computing system can update one or more values of one or more parameters of the embedding model based on the gradient of the loss function. For example, the gradient can be backpropagated through the embedding model.

At 36, the computing system can replace at least a refresh fraction of the embeddings in the embedding table using the updated embedding model. For example, the refresh fraction can be a hyperparameter that, for example, is user-specified. In some implementations, e.g., when the table is a full document cache, replacing the refresh fraction can include recomputing the embedding for the same items included in the refresh fraction. In other implementations, e.g., when the table is a streaming cache, replacing the refresh fraction can include sampling newly sampled items from the plurality of candidate items and replacing the item embeddings that were removed from the embedding table with new item embeddings generated for newly sampled items.

After 36, the computing system can optionally return to 16. For example, iterations of 16-36 (or portions thereof) can be iteratively performed until a stopping condition is met. Example stopping conditions include a loop counter meeting a threshold number, convergence, a iteration-over-iteration change in a performance metric of the model satisfying a threshold, etc. After the iterations have been completed, the embedding model can be provided as an output (e.g., for deployment). In some implementations, the method 12 of FIG. 1 is performed continuously in an online fashion during deployment of the embedding model. In some implementations, although 16-36 are discussed with reference in one training example for ease of understanding, 16-36 can be performed on a batch of training examples in parallel/at the same time.

Example Devices and Systems

FIG. 2A depicts a block diagram of an example computing system 100 that according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel embedding generation and/or retrieval across multiple instances of items).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., an embedding-based retrieval service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, a plurality of training examples. Each training example can include a query and one or more items that are labeled as positive items for the query. The positive items can be inferred and labeled as positives based on feedback data such as click through data, eye gaze data, impression data, explicit user feedback, and/or other forms of feedback data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an encoded image data output (e.g., an encoded and/or compressed representation of the image data, etc.).

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output.

In some implementations, the input to the machine-learned model(s) of the present disclosure can be speech data. The machine-learned model(s) can process the speech data to generate an output. As an example, the machine-learned model(s) can process the speech data to generate an encoded speech output (e.g., an encoded and/or compressed representation of the speech data, etc.).

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a compressed representation of the statistical data.

In some implementations, the input to the machine-learned model(s) of the present disclosure can be sensor data. The machine-learned model(s) can process the sensor data to generate an output. As an example, the machine-learned model(s) can process the sensor data to generate a compressed representation of the sensor data.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data). Additional examples of input data can include products, videos, movies, books, users, entities, locations, businesses, and/or any other item that can be embedded into a latent embedding space.

In some cases, the input includes visual data and the task is a computer vision task. In some cases, the input includes pixel data for one or more images and the task is an image processing task.

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
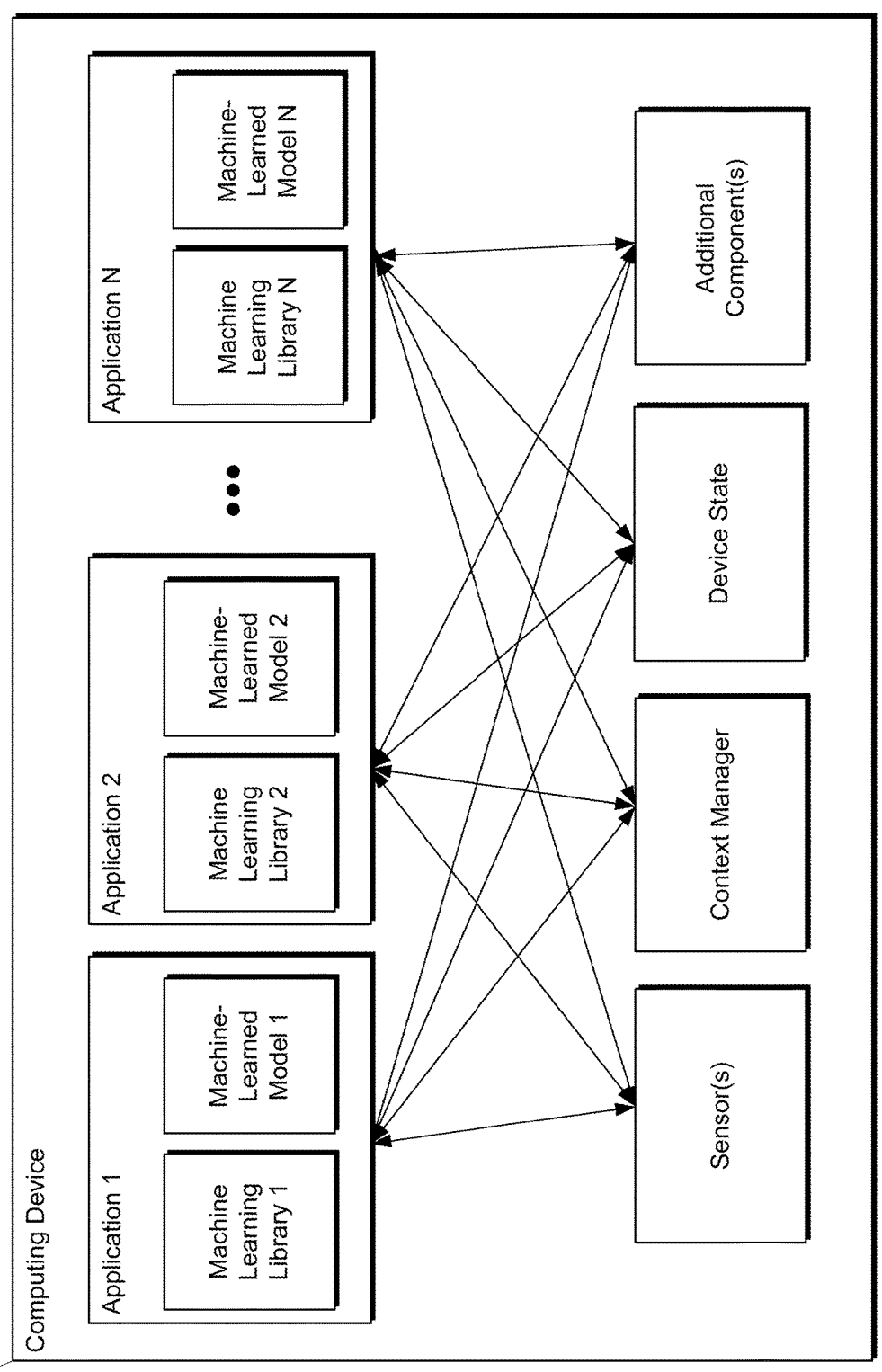
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
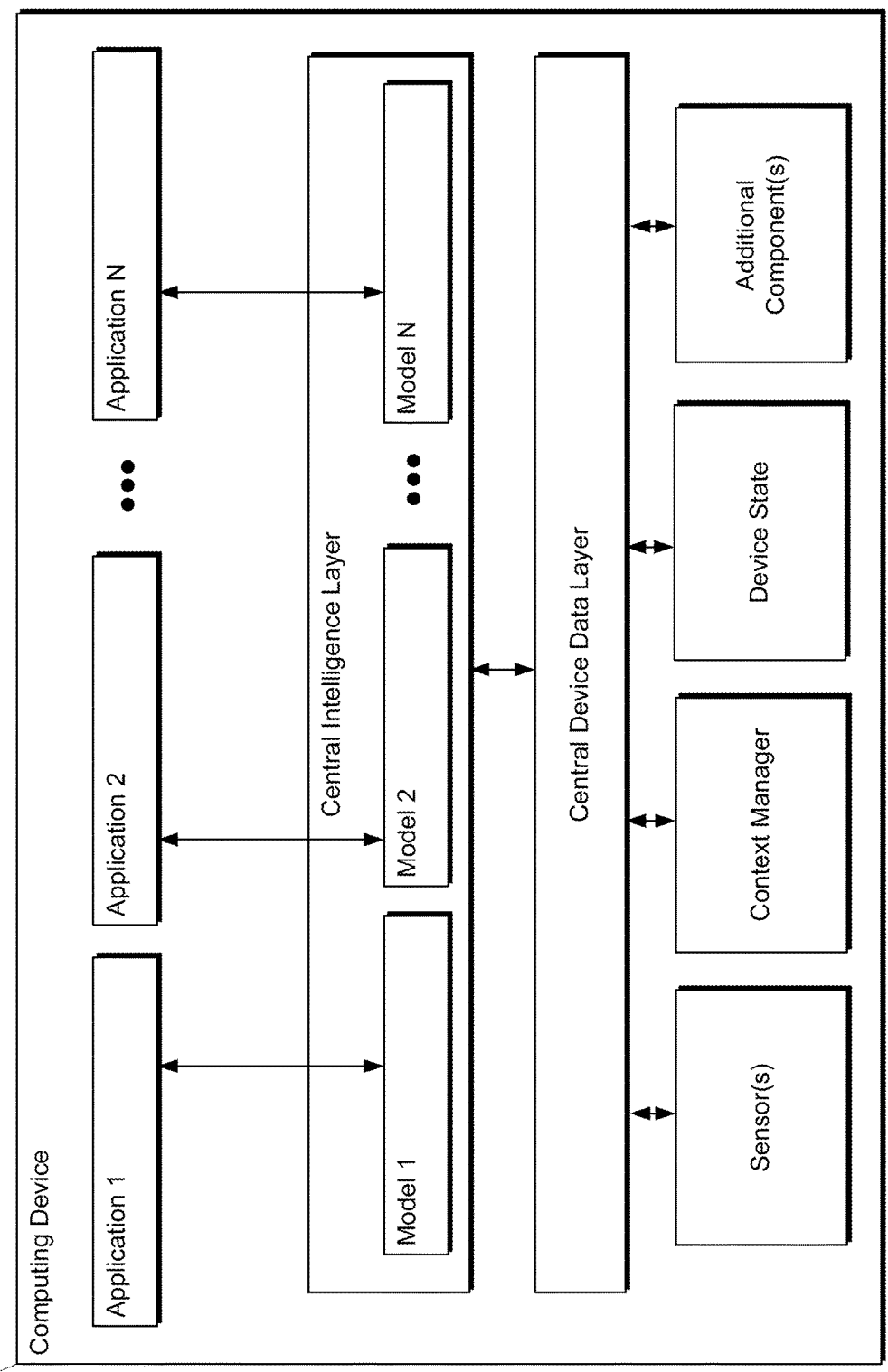
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training embedding models with improved efficiency, the method comprising:

for a plurality of training iterations:

processing, by a computing system, a query with an embedding model to generate a query embedding for the query;

accessing, by the computing system, an embedding table that stores a plurality of item embeddings for at least a portion of a plurality of candidate items, wherein the item embedding for at least one of the plurality of candidate items was generated by a previous version of the embedding model in one or more previous iterations;

generating, by the computing system, a plurality of similarity scores for the query embedding with respect to at least a portion of the plurality of item embeddings included in the embedding table;

sampling, by the computing system, from the plurality of candidate items based at least in part on the plurality of similarity scores to select one or more sampled items;

processing, by the computing system, the one or more sampled items with the embedding model to respectively generate one or more sampled item embeddings;

generating, by the computing system, one or more similarity scores for the query embedding with respect to the one or more sampled item embeddings; and updating, by the computing system, one or more values of one or more parameters of the embedding model based at least in part on the similarity scores generated for the query embedding with respect to at least a portion of the sampled item embeddings;

after the plurality of training iterations, providing, by the computing system, the embedding model as an output.

2. The computer-implemented method of claim 1, wherein sampling, by the computing system, from the plurality of candidate items based at least in part on the plurality of similarity scores comprises performing, by the computing system, a Gumbel-Max sampling technique to sample from the plurality of candidate items based at least in part on the plurality of similarity scores.

3. The computer-implemented method of claim 1, wherein the embedding table is stored in a memory portion of a hardware accelerator.

4. The computer-implemented method of claim 1, further comprising:

prior to processing the query with the embedding model:

obtaining, by the computing system, a training example from a training dataset, wherein the training example comprises the query and one or more positive items labeled as positive results for the query, the one or more positive items being a subset of the plurality of candidate items; and prior to generating the plurality of similarity scores:

processing, by the computing system, the one or more positive items with the embedding model to respectively generate one or more positive embeddings for the one or more positive items; and updating, by the computing system, the embedding table to include the one or more positive embeddings for the one or more positive items of the plurality of candidate items.

5. The computer-implemented method of claim 4, wherein updating, by the computing system, the one or more values of the one or more parameters of the embedding model comprises updating, by the computing system, the one or more values of the one or more parameters of the embedding model based at least in part on the similarity scores generated for the query embedding with respect to at least a portion of the positive items and at least the portion of the sampled items.

6. The computer-implemented method of claim 1, wherein updating, by the computing system, the one or more values of the one or more parameters of the embedding model comprises:

determining, by the computing system, an approximate gradient of a cross-entropy loss based on the similarity scores generated for the query embedding with respect to at least a portion of the sampled item embeddings; and updating, by the computing system, the one or more values of the one or more parameters of the embedding model based at least in part on the approximate gradient of the cross-entropy loss.

7. The computer-implemented method of claim 1, wherein the embedding table comprises a full document cache that stores item embeddings for all of the plurality of candidate items.

8. The computer-implemented method of claim 1, further comprising, for each iteration:

removing, by the computing system, from the embedding table the item embeddings associated with a fraction of the candidate items; and replacing, by the computing system, the item embeddings that were removed from the embedding table with new item embeddings generated for the fraction of the candidate items.

9. The computer-implemented method of claim 1, wherein the embedding table comprises a streaming cache that stores item embeddings for fewer than all of the plurality of candidate items.

10. The computer-implemented method of claim 9, further comprising, for each iteration:

removing, by the computing system, from the embedding table the item embeddings associated with a fraction of the candidate items;

sampling, by the computing system, newly sampled items from the plurality of candidate items; and replacing, by the computing system, the item embeddings that were removed from the embedding table with new item embeddings generated for newly sampled items.

11. The computer-implemented method of claim 1, wherein the embedding model comprises a two-tower dual encoding model that comprises a query encoder and an item encoder.

12. The computer-implemented method of claim 1, wherein the plurality of candidate items comprise:

images;

textual documents;

web documents;

products;

videos; or entities.

13. The computer-implemented method of claim 1, wherein the query comprises:

a textual query;

a voice query; or an image query.

14. A computing system for training embedding models with improved efficiency, the computing system comprising one or more processors and one or more non-transitory computer-readable media that store instructions that, when executed by the one or more processors, cause the computing system to perform operations, the operations comprising:

for a plurality of training iterations:

processing, by the computing system, a query with an embedding model to generate a query embedding for the query;

accessing, by the computing system, an embedding table that stores a plurality of item embeddings for at least a portion of a plurality of candidate items, wherein the item embedding for at least one of the plurality of candidate items was generated by a previous version of the embedding model in one or more previous iterations;

generating, by the computing system, a plurality of similarity scores for the query embedding with respect to at least a portion of the plurality of item embeddings included in the embedding table;

sampling, by the computing system, from the plurality of candidate items based at least in part on the plurality of similarity scores to select one or more sampled items;

processing, by the computing system, the one or more sampled items with the embedding model to respectively generate one or more sampled item embeddings;

generating, by the computing system, one or more similarity scores for the query embedding with respect to the one or more sampled item embeddings; and updating, by the computing system, one or more values of one or more parameters of the embedding model based at least in part on the similarity scores generated for the query embedding with respect to at least a portion of the sampled item embeddings;

after the plurality of training iterations, providing, by the computing system, the embedding model as an output.

15. The computing system of claim 14, wherein sampling, by the computing system, from the plurality of candidate items based at least in part on the plurality of similarity scores comprises performing, by the computing system, a Gumbel-Max sampling technique to sample from the plurality of candidate items based at least in part on the plurality of similarity scores.

16. The computing system of claim 14, wherein the embedding table is stored in a memory portion of a hardware accelerator.

17. The computing system of claim 14, wherein the operations further comprise:

prior to processing the query with the embedding model:

obtaining, by the computing system, a training example from a training dataset, wherein the training example comprises the query and one or more positive items labeled as positive results for the query, the one or more positive items being a subset of the plurality of candidate items; and prior to generating the plurality of similarity scores:

processing, by the computing system, the one or more positive items with the embedding model to respectively generate one or more positive embeddings for the one or more positive items; and updating, by the computing system, the embedding table to include the one or more positive embeddings for the one or more positive items of the plurality of candidate items.

18. One or more non-transitory computer-readable media that store an embedding model that has been trained by performance of operations, the operations comprising:

for a plurality of training iterations:

processing, by a computing system, a query with an embedding model to generate a query embedding for the query;

accessing, by the computing system, an embedding table that stores a plurality of item embeddings for at least a portion of a plurality of candidate items, wherein the item embedding for at least one of the plurality of candidate items was generated by a previous version of the embedding model in one or more previous iterations;

generating, by the computing system, a plurality of similarity scores for the query embedding with respect to at least a portion of the plurality of item embeddings included in the embedding table;

sampling, by the computing system, from the plurality of candidate items based at least in part on the plurality of similarity scores to select one or more sampled items;

processing, by the computing system, the one or more sampled items with the embedding model to respectively generate one or more sampled item embeddings;

generating, by the computing system, one or more similarity scores for the query embedding with respect to the one or more sampled item embeddings; and updating, by the computing system, one or more values of one or more parameters of the embedding model based at least in part on the similarity scores generated for the query embedding with respect to at least a portion of the sampled item embeddings.

19. The one or more non-transitory computer-readable media of claim 18, wherein the embedding table comprises a full document cache that stores item embeddings for all of the plurality of candidate items.

20. The one or more non-transitory computer-readable media of claim 18, wherein the embedding table comprises a streaming cache that stores item embeddings for fewer than all of the plurality of candidate items.

* * * * *